Dec. 15, 1953

M. IRELAND 2,662,466

BREAD-ACTUATED CONTROL FOR TOASTERS

Filed Dec. 10, 1949

INVENTOR.
MURRAY IRELAND
BY
Oscar W. Hane
ATTORNEY

Dec. 15, 1953 M. IRELAND 2,662,466
BREAD-ACTUATED CONTROL FOR TOASTERS
Filed Dec. 10, 1949 3 Sheets-Sheet 2

INVENTOR.
MURRAY IRELAND
BY
Oscar W. Tiers
ATTORNEY

Dec. 15, 1953

M. IRELAND 2,662,466

BREAD-ACTUATED CONTROL FOR TOASTERS

Filed Dec. 10, 1949

INVENTOR.
MURRAY IRELAND
BY
Oscar W. Giese
ATTORNEY

Patented Dec. 15, 1953

2,662,466

UNITED STATES PATENT OFFICE 2,662,466

BREAD-ACTUATED CONTROL FOR TOASTERS

Murray Ireland, Elgin, Ill., assignor to McGraw Electric Company, Elgin, Ill., a corporation of Delaware Application December 10, 1949, Serial No. 132,303

2 Claims. (Cl. 99—391)

The present invention relates to automatic cooking devices such as electric toasters.

Objects of the invention include the provision of an improved mechanism for supporting and carrying an article to be cooked in a toaster or the like, the provision of an improved control apparatus for responding to the presence of an article to be cooked, and the provision of an improved construction for a bread-controlled electric toaster. Other objects will be apparent from the following description of certain specific embodiments which illustrate by way of example, the manner in which the invention may be put into practice. In the drawings.

Figure 1:
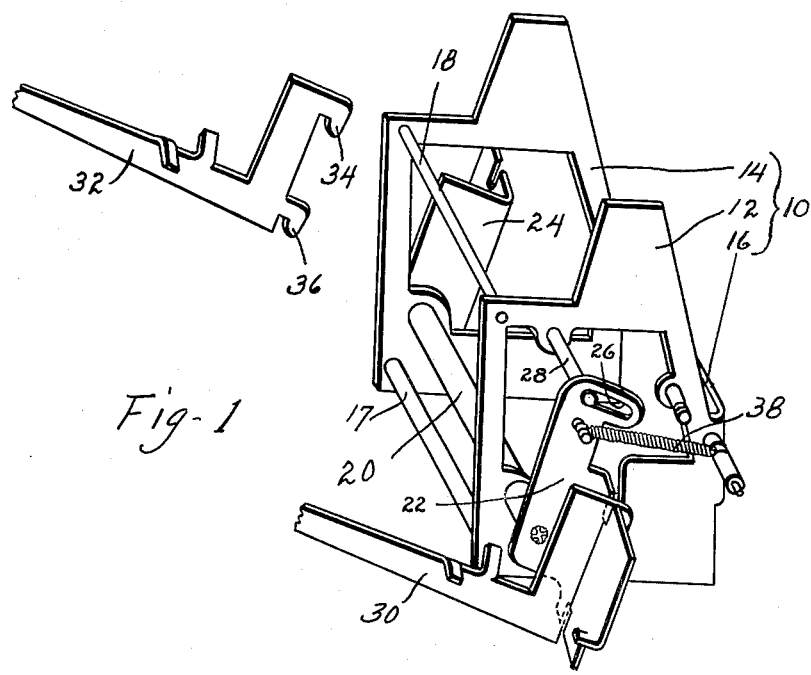
Figure 1 is a pictorial view of a part of the bread-supporting and transporting structure of a toaster embodying the present invention.
Figure 2:
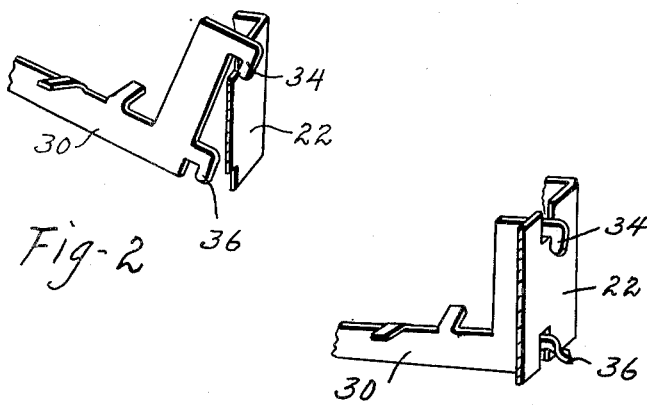
Figs. 2 and 3 are pictorial views illustrating certain details of the construction in Fig. 1.
Figure 3:
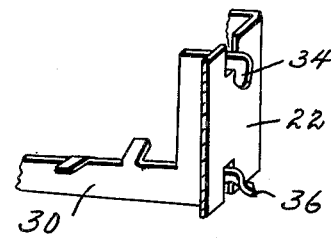

In Fig. 1, a frame structure 10 comprises two side walls 12 and 14 connected by strap 16 and stretcher bars 17 and 18. Extending across this frame is a rotatable shaft 20 on the two ends of which are fixed brackets 22 and 24. A slot 26 in the upper end of bracket 22 cooperates with a pin 28 fixed on the side plate 12 for limiting the angular rotation of shaft 20. Supported on the brackets 22 and 24 are bread-supporting racks 30 and 32, rack 32 being shown detached for revealing its construction. Each rack has a pair of L-shaped ears 34 and 36 which fit into notches of the brackets 22 and 24 for loosely supporting the racks thereon. As may best be seen in Figs. 2 and 3 the rack 30, for instance, is mounted on the bracket 22 by first hooking the ear 34 into the upper notch. Then the ear 36, when swung in the lower notch, will prevent disengagement of the upper ear 34. Ear 36 then is bent to prevent its removal. This structure, while it provides vertical support for the racks 32 and 34, leaves them free to swing laterally. When the racks 30 and 32 are unloaded, a spring 38 rotates the brackets 22 and 24 and the shaft 20, which supports them, clockwise against the pin 28 to tilt the racks 30 and 32 up as shown in Fig. 1. The weight of a slice of bread on either rack will rotate the shaft and brackets to the left, but the pin 28 permits the racks to swing down only to the horizontal position.

Figure 4:
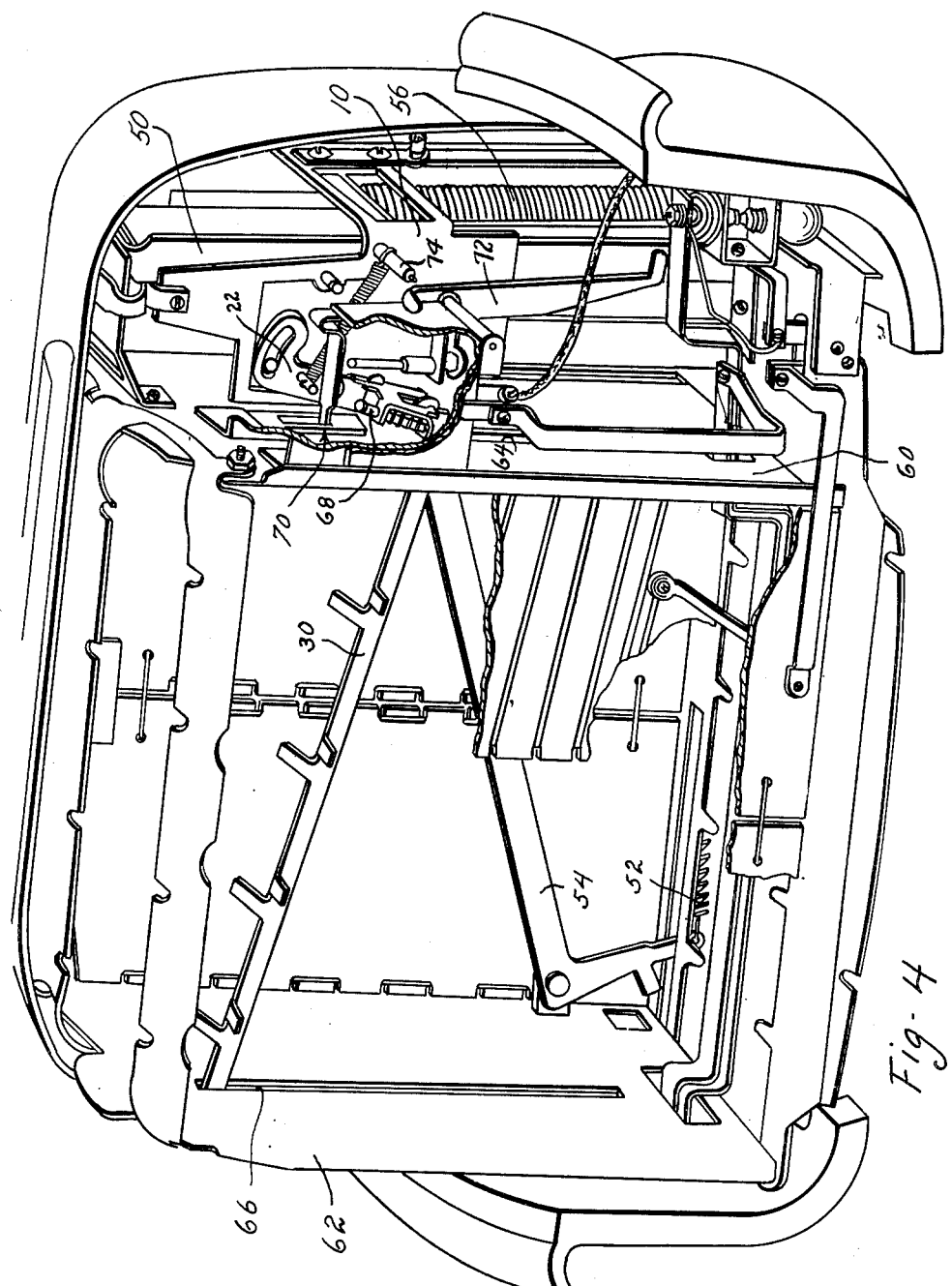
Fig. 4 is a pictorial view of an automatic electric toaster including the apparatus of Fig. 1.

As is shown in Fig. 4, the frame structure 10 constitutes a vertically movable carriage in an automatic electric toaster. Certain parts of the structure of Fig. 4 are shown more in detail in my co-pending application, Ser. No. 132,304, filed December 10, 1949, for Bread-Actuated Electric Toaster. The carriage 10 slides on vertical guides 50, and is biased to the uppermost position by a spring 52 acting on a bell crank 54 which bears upward against the stretcher bar 17 which is shown in Fig. 1. An electromagnet 56 is adapted, when energized, to pull the carriage 10 down to its lowermost position against the force of the spring 52.

The carriage 10 is mounted just outside an oven which is defined in part by end walls 60 and 62. As may be seen in Fig. 4, the bread-supporting rack 30 extends the full length of the oven and lies in slots 64 and 66 in the two end walls. These slots, and particularly the slot 66, at the outer end of the rack 30, constitute guides for limiting its lateral movement. Rack 32 (Fig. 3) similarly extends through slots in the two end walls of the oven and is guided by a vertical slot in the wall at its outer end. It will be seen that the freedom of the racks 30 and 32 to swing laterally on their supporting brackets 22 and 24 insure that no slight misalignment of the parts can cause any binding of racks 30 and 32, nor permit any such errors to appear as magnified displacements of the outer ends of those racks. The bracket 22 also carries a pin 68, as seen in Fig. 4, for actuating a latch mechanism 70 that controls the switch for energizing magnet 56.

The mechanism of the toaster of Fig. 4 is shown in the position it occupies when the toaster is idle and is unloaded. When a slice of bread is placed on either of the racks 30 or 32 the shaft 20 and the brackets 22 and 24 both rotate to swing the two racks to their horizontal position. This action causes pin 68 to trip the latch 70 for energizing magnet 56 which thereupon pulls the carriage 10, and with it the racks 30 and 32, to their lowest position. This motion lowers the bread supported by the racks down into the toasting space between the heating electric elements which are located in the oven. A bell crank 72 actuated by a pin 74 on the carriage 10 opens the switch 70 when the carrier reaches its bottom position. During the toasting operation the carrier is held in its lower position by a latch (not shown) and at the end of a toasting operation this latch is released by a timer (also not shown) so that the carrier is lifted by spring 52 to its upper position for terminating the toasting operation. Removal of the toast from the bread racks 30 and 32 and reloading of them again actuates the switch 70 for repeating the operation. This action is described in more detail in application Ser. No. 132,304, already referred to.

Figure 5:
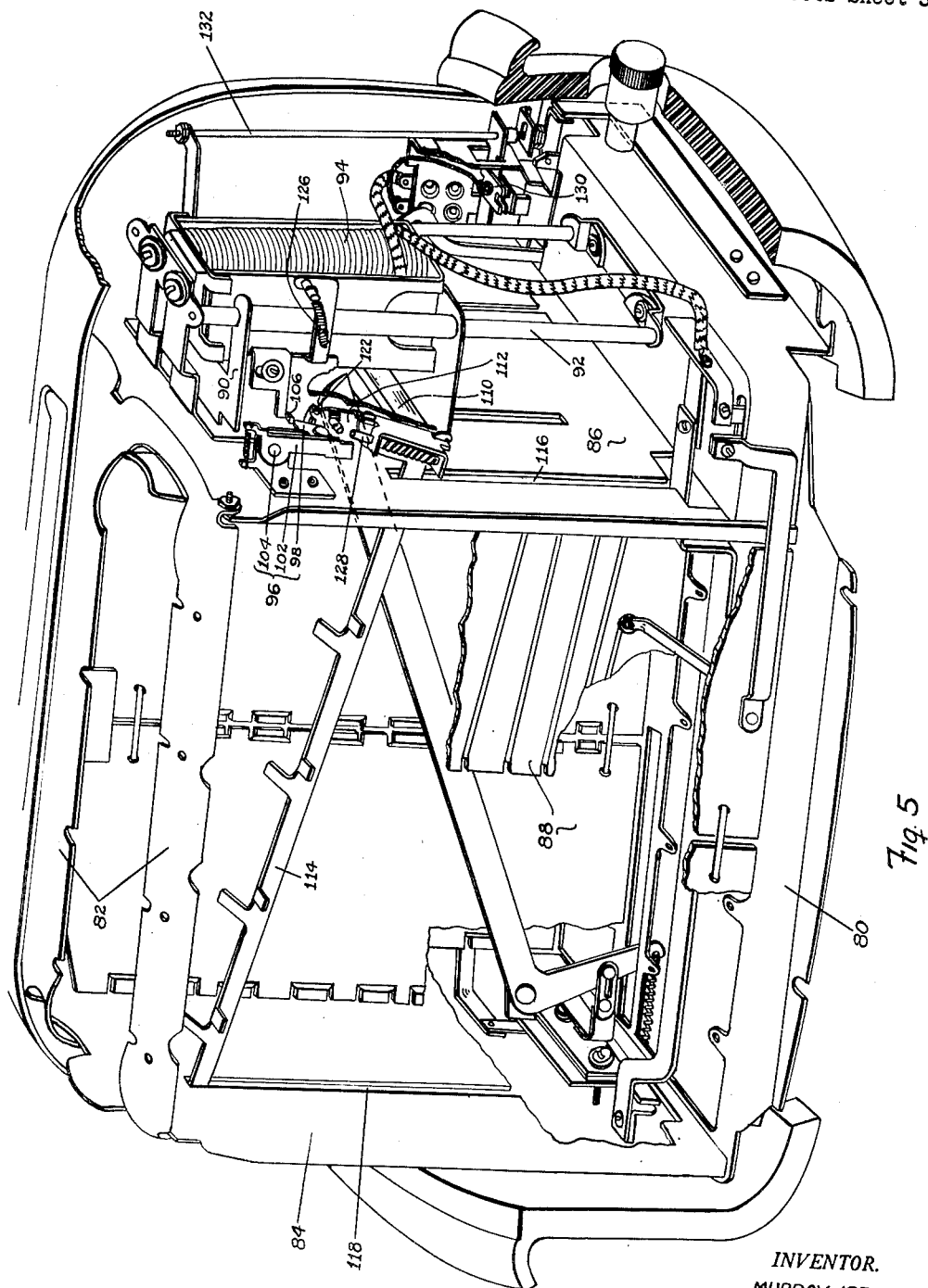
Fig. 5 is a similar view of a toaster of a different construction embodying the present invention.

In the modification of Fig. 5, a toaster frame structure comprising a base 80, an oven cap 82, and oven end walls 84 and 86, encloses an oven space in which are located electric heating elements 88. Mounted on the frame structure but located outside the oven space is a carriage 90 that slides on vertical guides 92. Magnet 94 is adapted to lift this carriage to its uppermost position on the guides where, while the toaster is idle, it is held by latch 96. The carriage is adapted to drop to its lowermost position when this latch is released. The latch includes a detent 98 carried on a lever 102 pivoted at 104, which detent engages a lug 106 on the carriage 90.

A transverse horizontal shaft 110, supported on the carriage 90, has brackets fastened to its two ends, of which only bracket 112 shows in the drawing. Bracket 112 supports a rack 114 which extends through the oven and lies in vertical slots 116 and 118 in the two end walls 84 and 86. As in the toaster of Fig. 4, the rack 114 is loosely mounted on bracket 112 so that it can swing laterally thereon and is guided by the oven slots. A similar rack is similarly supported on the bracket at the other end of shaft 110. An ear 122 on the bracket 112 moves in a slot in the frame of the carriage 90 to limit the rotation of shaft 110 so that the rack 114 swings only between the tilted-up position shown in Fig. 5 and a horizontal position. A spring 126 normally holds the racks tilted up. The weight of a slice of bread swings them down.

The bracket 112 also carries a pin 128 which moves against the arm 102 for releasing the latch 96 when bread is placed on the rack 114. This action permits the carriage to drop to its lowermost position for carrying the bread down into the oven space and between the electric heating elements therein. At the end of a toasting operation a timer, not shown, actuates a switch 130 for energizing the magnet 94 for raising the carriage. At the end of this upward motion the carriage lifts a bar 132 for re-opening the switch 130. Thereafter removal of the toast from the racks and reloading one or both of them again actuates the latch 96 for repeating the operation. The construction of Fig. 5 and its operation is described in more detail in my co-pending application, Ser. No. 132,305, filed December 10, 1949 for Bread-Actuated Electric Toaster.

The present invention is not limited to the specific structures herein shown and described but includes various modifications and variations within the scope of the claims.

I claim:

1. In combination in an automatic cooking device, an oven, a carriage disposed wholly outside said oven and mounted for vertical movement, a supporting bracket member hingedly mounted on said carriage for limited movement about a substantially horizontal axis and disposed outside said oven, an elongated rack extending across said oven from side to side thereof in a direction approximately perpendicular to said axis, means mounting said rack on said supporting bracket member in relatively fixed vertical position with respect thereto and with permissive lateral movement relative thereto whereby said supporting bracket member and rack pivot in unison about the hinge axis to swing the rack up and down relative to said carriage, a vertical guide in said oven for limiting lateral movement of said rack, and a stop on said carriage cooperating with said bracket member for limiting pivotal movement of said supporting bracket member and resultant downward pivoting of the rack beyond a substantially horizontal position in said oven to enable the rack to support food thereon in said oven.

2. In the combination as claimed in claim 1, wherein there are provided two separate oven spaces and two elongated racks, with each rack extending across a separate oven space.

MURRAY IRELAND.

References Cited in the file of this patent

UNITED STATES PATENTS

| Number | Name | Date |
|---|---|---|
| 1,624,893 | Marsden | Apr. 12, 1927 |
| 1,954,894 | Shenton | Apr. 17, 1934 |
| 2,171,897 | Sardeson | Sept. 5, 1939 |
| 2,257,883 | McCarthy | Oct. 7, 1941 |
| 2,288,713 | Ireland | July 7, 1942 |
| 2,347,385 | Wright et al. | Apr. 25, 1944 |
| 2,361,446 | Anderson | Oct. 31, 1944 |
| 2,404,976 | McCullough et al. | July 30, 1946 |
| 2,426,620 | Koci | Sept. 2, 1946 |